United States Patent [19]

Kurihara

[11] 4,213,175
[45] Jul. 15, 1980

[54] FAULT-DETECTING APPARATUS FOR CONTROLS

[75] Inventor: Nobuo Kurihara, Hitachiota, Japan

[73] Assignee: Hitachi, Ltd., Tokyo, Japan

[21] Appl. No.: 921,074

[22] Filed: Jun. 30, 1978

[30] Foreign Application Priority Data

Jul. 4, 1977 [JP] Japan ................................ 52-79122

[51] Int. Cl.² ...................... G05B 17/00; G05B 13/02; G06F 15/46
[52] U.S. Cl. ...................................... 364/119; 318/561; 364/106
[58] Field of Search ............... 364/119, 118, 105, 106, 364/424, 443; 244/194, 195; 318/561, 563

[56] References Cited

U.S. PATENT DOCUMENTS

| | | | |
|---|---|---|---|
| 3,534,400 | 10/1970 | Dahlin ................................. | 364/106 |
| 3,601,588 | 8/1971 | Bristol ................................. | 364/106 |
| 3,621,217 | 11/1971 | Carr et al. .......................... | 364/106 |
| 3,728,085 | 4/1973 | Horiguchi et al. ............... | 364/106 X |
| 3,767,900 | 10/1973 | Chao et al. ......................... | 364/106 |
| 3,876,871 | 4/1975 | Sinner ................................. | 364/106 |
| 4,054,780 | 10/1977 | Bartley et al. ..................... | 364/106 |

Primary Examiner—Joseph F. Ruggiero
Attorney, Agent, or Firm—Craig and Antonelli

[57] ABSTRACT

A fault-detecting apparatus comprises a model simulating the input-output characteristics of an object for fault detection. The model includes statics and dynamics and is impressed with the same input as the object for fault detection. The output of the model is compared with the output of the object for fault detection, and if the deviation is great, it is indicated that a fault has generated in the object for fault detection. In order to determine whether or not correction of the model is possible, the degree of the deviation is determined from an average value of the time-series signals produced from various parts of the fault-detecting apparatus during a certain period of time. For this purpose, a variation is calculated, for example; and if it is smaller than a predetermined value $V_L$, a normal condition is judged and the statics correction is considered possible, while if the variation is larger than $V_H$ (which in turn is larger than $V_L$), a transient condition is judged, and the dynamics correction is considered possible. Correction of the characteristics is effected by processing the data applied to the fault-detecting apparatus for the previous certain period of time.

7 Claims, 14 Drawing Figures

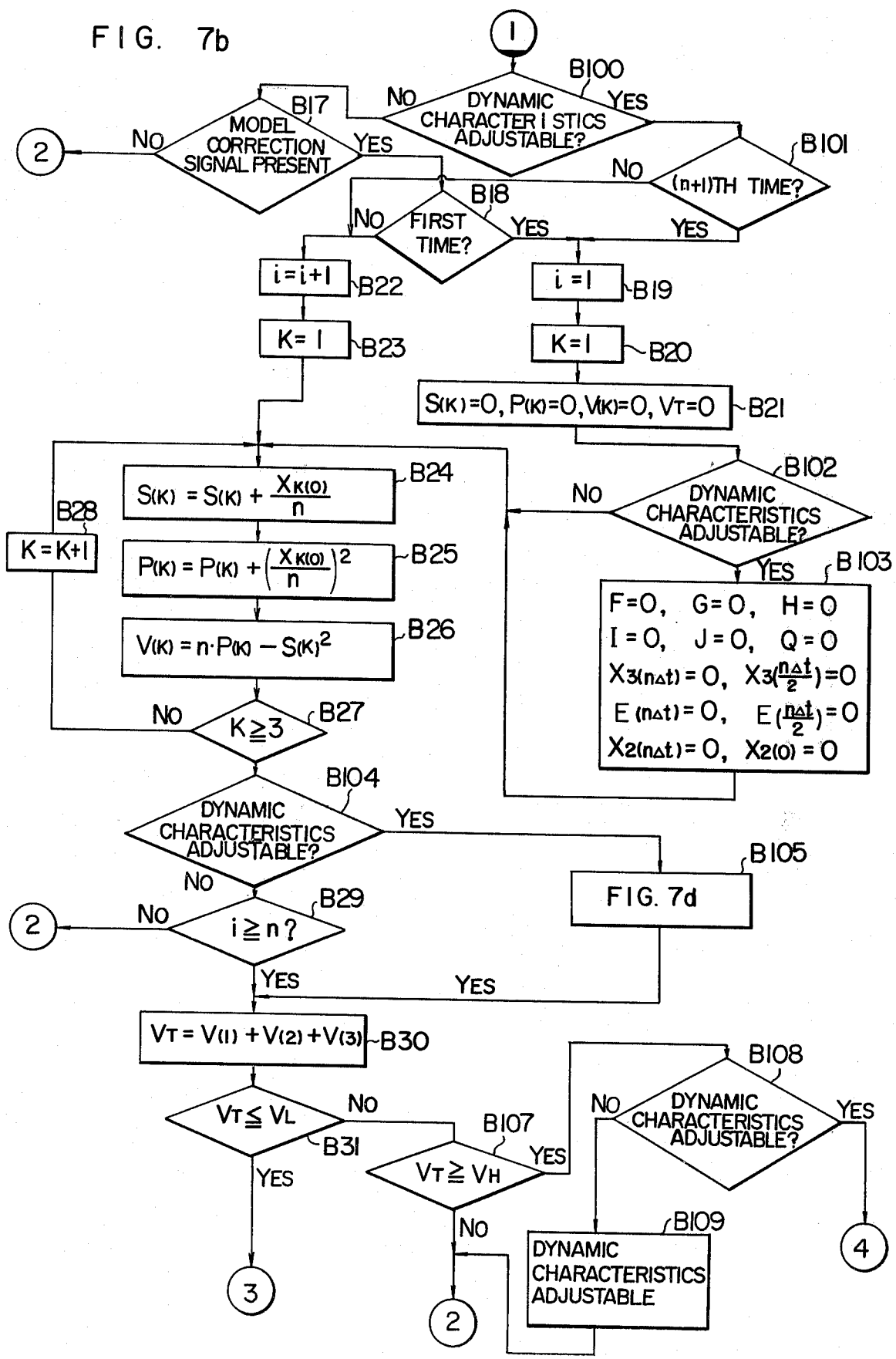

FAULT-DETECTING APPARATUS FOR CONTROLS

BACKGROUND OF THE INVENTION

This invention relates to an apparatus for detecting a fault of controls and a plant which is an object for control in an automatic control device, or more in particular to a fault-detecting apparatus for the automatic control device, comprising a model simulating the characteristics of the controls and the plant for detecting a fault of the plant or like by a model reference method in which the output of the model is compared with that of the plant.

Automatic control devices are widely used industrially, and many of them are what are called closed-loop control devices using feedback signals. In other words, a plant which is an object for control is operated in response to an output signal from the controls, which in turn are operated in response to a deviation between the plant output and a target signal associated therewith. In such a system, the plant output is generally called a feedback signal. In the event of a fault of this control device, the plant will unexpectedly experience a run away condition or shut down without being controlled as directed by the target signal. Generally, the shutdown of a plant is a safe reaction to occurrence of a fault and does not pose a great problem. In the case where the object plant is connected to another plant, however, such another plant is undesirably affected by the fault. This effect is larger, the larger the size of the system or the more complicated it is. If the fault is a run-away, the effect is much greater, sometimes leading to the breakdown of devices and equipment.

For these reasons, various methods have so far been suggested for detecting a fault of the controls at an early time in order to take action suitable to the plant involved. One of the conventional methods for detecting a fault of the controls is by monitoring a deviation between a target signal and a feedback signal, such as disclosed by the Japanese Patent Application Publication No. 6815/72, which is based on the theory that "under the normal condition, the target signal substantially coincides with the feedback signal". Thus, it is possible to detect a fault with high accuracy under normal conditions, but many problems are posed under transient conditions. When the target value is changed, for instance, the absolute value of the deviation signal is increased. From this mere fact, it is impossible to judge whether it is due to the change in target value (normal) or a fault of the devices (abnormal). Further, in the case where response of the plant is delayed, the condition of a large deviation continues for a long period of time. If the detection sensitivity of the fault-detecting apparatus is increased, an erroneous judgement is likely to be made, while in order to reduce the chance of erroneous judgement, the detection sensitivity is required to be reduced. In short, detection of a fault is difficult by deviation monitoring.

Instead of such a method, a model reference method is now drawing attention as disclosed in, for instance, the Japanese Patent Application Publication No. 58279/73. This method uses a model having the input-output characteristics of $W(s) = G_1(s) \cdot G_2(s) / 1 + G_1(s) \cdot G_2(s)$ where $G_1(s)$ is the input-output characteristics of the controls and $G_2(s)$ the input-output characteristics of the plant. This model is impressed with a deviation signal between the model output and the plant output, so that the model output is compared with a feedback signal making up the plant output. $W(s)$ is generally called the overall transfer function. In the model reference method, the model $W(s)$ may take either analog or digital form. If $W(s)$ is complicated, however, it should preferably be carried out digitally by using a microcomputer or like. If the feedback control system which is an object for fault detection has no fault, the signal passed through the model $W(s)$ coincides with the feedback signal and the deviation signal between them is zero no matter what change the target signal undergoes. As compared with the above-mentioned deviation reference method in which the deviation signal changes at the transient time under normal conditions, the model reference method, for lack of any change under normal conditions, has an improved detection sensitivity and has less cases of judgement error.

In order to achieve the effect of the model reference method sufficiently, however, the model characteristics are required to coincide sufficiently with the input-output characteristics of the object for fault detection. For this purpose, model characteristics are designed very carefully to determine model parameters. Nevertheless, it is impossible to attain complete coincidence of characteristics, and also an error is likely to occur more often with the lapse of time due to deterioration of the object for fault detection and the model. In order to obviate this shortcoming, the model is readjusted periodically or seasonally. In view of the fact that the readjustment is complicated and requires much labor and time, however, the model itself should preferably have the function to adjust the model parameters.

In the model reference adaptive system (M.R.A.S.) used for control of airplanes, for example, a method for adjusting model parameters is used in which the model parameters are continuously corrected in such a manner as to minimize the square integration value of the deviation signal between the model output and the object output. In such a system, however, adjustment requires a long time in the case of an object having a large time constant or where many unknown parameters are involved. Also, since the characteristics of the object for detection do not substantially change with time under normal conditions, continuous adjustment as in M.R.A.S. is not required.

The input and output characteristics of the plant have static and dynamic characteristics which must be distinguished from each other in proper model correction. For independent correction thereof, however, information suitable for correcting the characteristics is required, and also it is necessary to determine whether the plant is under operating conditions suitable for collecting such information.

SUMMARY OF THE INVENTION

Accordingly, it is an object of the present invention to provide a fault-detecting apparatus for controls, in which a model simulating the plant characteristics is capable of being corrected appropriately.

Another object of the present invention is to provide a fault-detecting apparatus for controls, which is capable of judging whether or not the plant is in operating conditions where the dynamic and static characteristics of the model are capable of being corrected respectively.

A further object of the invention is to provide a fault-detecting apparatus for controls, in which the best information required for correction of the dynamic and static characteristics of the model is collected in order to correct the characteristics thereof.

According to the present invention, there is provided a fault-detecting apparatus for controls, comprising a model having the characteristics equivalent to the input-output characteristics of the object for fault detection, the model being impressed with an input to the object, means for monitoring the deviation between the output of the model and the output of the object for fault detection, and means for indicating a fault of the object in response to a large value of the deviation. The apparatus further comprises means for producing signals from the various parts of the object in time series for a certain period of time, means for monitoring the degree of deviation of the signals from an average value thereof, means for comparing the degree of deviation with a predetermined degree of deviation and for judging whether model correction is possible, and means for correcting the model in response to the inputs applied for the certain period of time when model correction is possible.

BRIEF DESCRIPTION OF THE DRAWINGS

FIGS. 7a to 7d is a flow chart of a program showing the steps to be followed in realizing the fault-detecting apparatus according to the present invention in the form of digital computer, or especially the steps associated for correction of the static and dynamic characteristics of the model.

DESCRIPTION OF THE PREFERRED EMBODIMENTS

Figure 1:
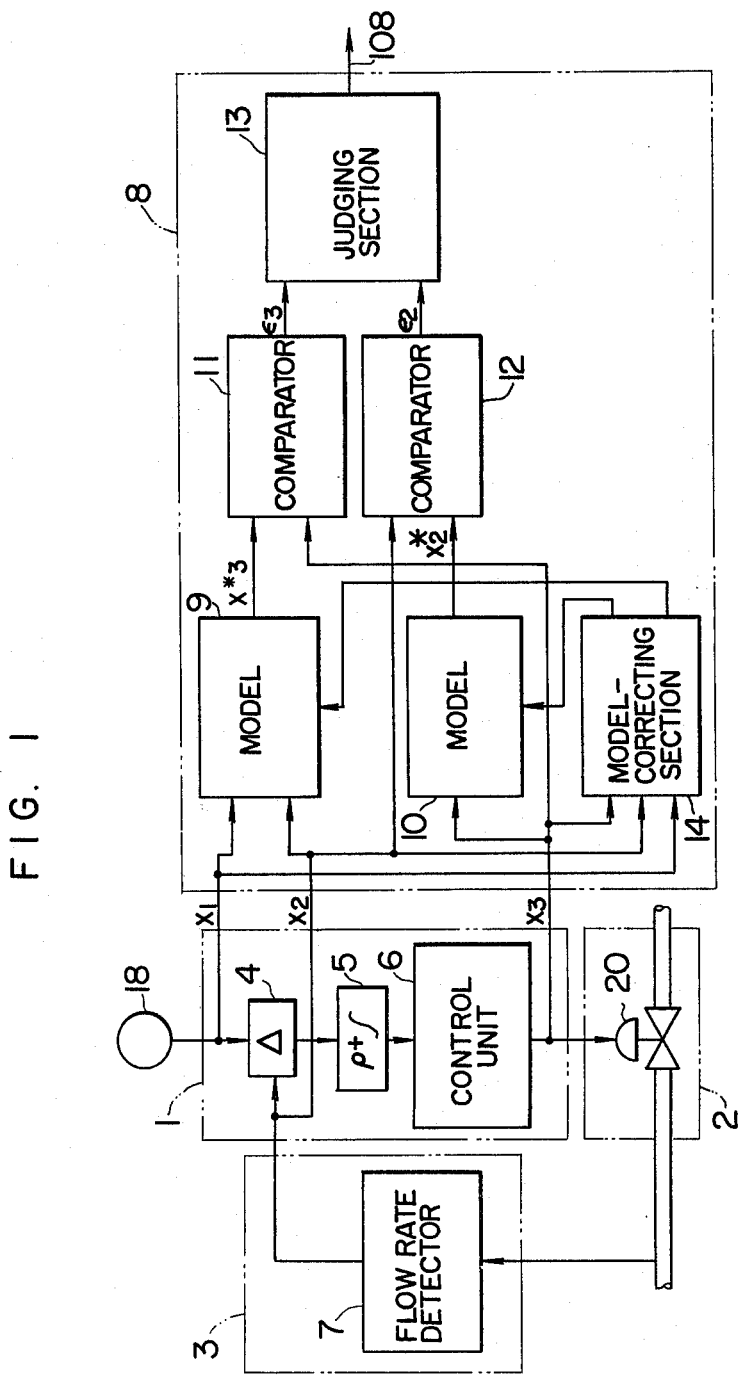
FIG. 1 is a block diagram for explaining the general functions of a fault-detecting apparatus according to the present invention and an automatic control device constituting an object to be monitored by the apparatus.

The diagram of FIG. 1 shows a fault-detecting apparatus 8 according to the present invention installed on an ordinary control device. In the drawing, a calculation section 1 of the control device is impressed with a setting signal $X_1$ from a setter 18 and a feedback signal $X_2$ from a detector 3 and after calculation, produces an operation signal $X_3$. The opening of a valve 20 of an operation terminal 2 is controlled by the operation signal $X_3$. The flow rate controlled by the opening-closing operation of the valve 20 is detected by a flow-rate detector 7 in a detection terminal 3. The output of the detector 7 makes up the feedback signal mentioned above. Various types of calculation section in the control device are available. One of the most typical types is a proportional integration calculation, in which case the control device 1 is comprised of a subtractor 4 for producing the difference between $X_1$ and $X_2$ and a calculator 5 for effecting proportional integration of the output of the subtractor 4. Also, an auto-manual switch is provided as required. In contrast with the calculation section 1, the operation terminal 2 and the detection terminal 3 will be hereinafter collectively called the operation-detection section.

The fault-detecting apparatus 8 is preferably a digital device using a microcomputer or like and is shown in a block diagram in order to describe the general configuration of the apparatus according to the present invention. The calculation section 1 and the operation-detection section will be separately explained below with reference to fault detection.

Numeral 9 shows a model for fault detection of the calculation section 1, which model 9, like the calculation section 1, is supplied with inputs $X_1$ and $X_2$ and produces a model output $X_3^*$ corresponding to the operation signal $X_3$. Numeral 10 shows a model for fault detection of the operation-detection section which model is supplied with $X_3$ and produces a model output $X_2^*$ corresponding to the feedback signal $X_2$. The asterisks "*" attached to symbols $X_2$ and $X_3$ show that the particular symbols represent model outputs. Numeral 11 shows a comparator for determining the difference $\epsilon_3$ between the model output $X_3^*$ and the corresponding output $X_3$ of the calculation section 1. Numeral 12 shows also a comparator for determining the difference $\epsilon_2$ between the model output $X_2^*$ and the corresponding output $X_2$ of the operation-detection section. Numeral 13 shows a judging section for producing a fault generation signal 108 when the values $\epsilon_3$ and $\epsilon_2$ deviate from the limits $\epsilon_{30}$ and $\epsilon_{20}$ set for them respectively. Numeral 14 shows a model-correcting section making up the essential part of the apparatus according to the present invention, which determines a variation in response to $X_1$, $X_2$ and $X_3$ applied thereto, and corrects the models 9 and 10 in accordance with the values of the variation.

Figure 2A:
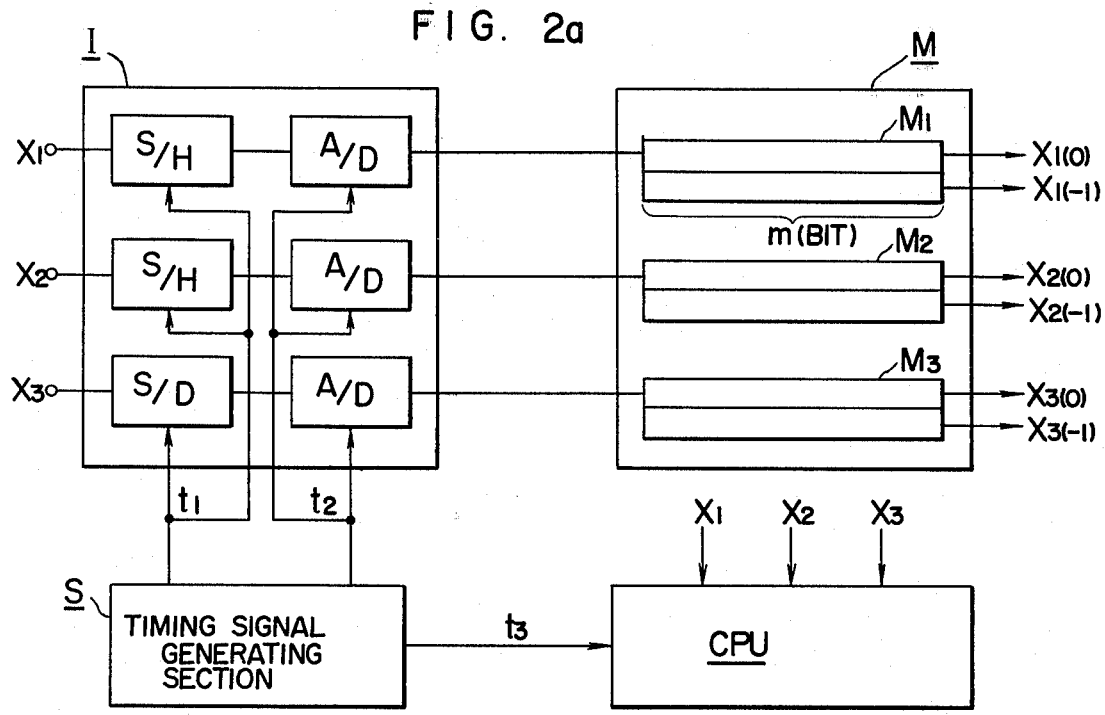
FIGS. 2a and 2b are diagrams showing general configurations of an input section, a memory section, a timing pulse-generating section and a calculation section of a digital computer which may constitute the fault-detecting apparatus according to the present invention.

A configuration of the digital computer which may make up the fault-detecting apparatus according to the present invention is shown in FIG. 2. In the drawing, reference character I shows an input section, character M a storage or memory section, CPU a central processing unit, S a timing signal-generating section, and O an output section.

The input section I is supplied with $X_1$, $X_2$ and $X_3$, which are applied to the sampling-hold circuits S/H. The instantaneous values of $X_1$, $X_2$ and $X_3$ upon application of the signal $t_1$ to S/H from the timing signal generating section S are stored in the memory M. The outputs of the sampling/hold circuits are applied to the analog-digital converters A/D where they are converted into digital signals of m bits. These digital signals are transferred to the memory section M in response to the signal $t_2$ supplied from the timing signal-generating section S.

The memory section M has memories $M_1$, $M_2$ and $M_3$ for storing $X_1$, $X_2$ and $X_3$ respectively, and each of the memories has two shift registers of m bits. If the two shift registers of $M_1$ are called $M_{1(0)}$ and $M_{1(-1)}$, then the latest output of the A/D converter is stored in the memory $M_{1(0)}$. At the same time, the data thus far stored in the memory $M_{1(0)}$ is transferred to the memory $M_{1(-1)}$. When the data stored in the memory $M_{1(0)}$ is transferred to memory $M_{1(-1)}$, the data thus far stored in $M_{1(-1)}$ is erased. Data are similarly transferred also in $M_2$ and $M_3$. In short, each memory always keep in store two data obtained in time series, and when the latest data is applied to a memory, the oldest one therein is erased. The data stored in the shift registers $M_{1(0)}$ and $M_{1(-1)}$ will hereinafter be expressed $X_{1(0)}$ and $X_{1(-1)}$ respectively. This also applies to $X_2$ and $X_3$. $X_{1(0)}$ means a value of $X_1$ obtained at the current sampling time point, and $X_{1(-1)}$ a value of $X_1$ at the immediately previous sampling time point.

Figure 2B:
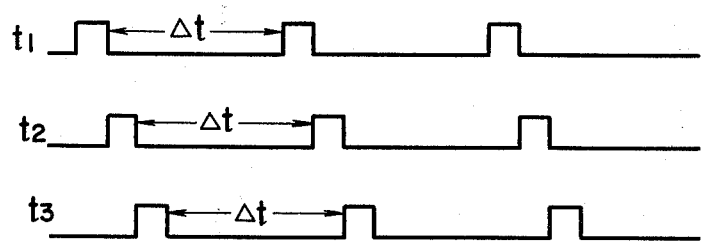

CPU, in response to the data stored in the memories $M_1$, $M_2$ and $M_3$, performs the functions as explained with the fault-detecting apparatus 8 in FIG. 1 when a drive command $t_3$ is supplied. This drive command $t_3$ is supplied from the timing signal-generating section S. The timing signal-generating section S produces outputs $t_1$, $t_2$ and $t_3$ in that order as shown in FIG. 2b. The period $\Delta t$ between generation of the respective outputs of each timing signal is fixed. For CPU, the period $\Delta t$ of the command $t_3$ means what may be called a control period.

The diagram of FIG. 3 shows a flow chart illustrating the steps to be followed in CPU. The functions performed by the CPU program are roughly divided into the three categories as described with reference to FIG. 1.

I. Fault detection by a detected value and a model output

II. Calculation of a variation value

III. Model correction

Of these functions, only the function I works each time of application of the drive command $t_3$. The functions II and III, on the other hand, work only when, say, a command is given by the operator. The function III also works in accordance with the result of judgement by the function II. The CPU program will be explained below with reference to the functions I, II and III in that order.

In FIG. 3, upon receipt of the CPU start command, the step B2 confirms whether or not two data are secured in the memories respectively. By the way, the start is confirmed by the presence of the drive command $t_3$, and if the data is not secured in step B2, transfer is made to B3 as a final step. Otherwise, the function I is executed.

Prior to explanation about the function I, the characteristics of the model that form the basis of the function will be explained. In FIG. 1, there are various types of model depending on the part of the control device which is monitored. If fault detection about the whole of the control device is desired, for example, a model simulating a general transfer function of the control device is used. In this case, however, the part of the control device where a fault occurs is not identified. Explanation will be made below of the case where two models of the calculation section and the operation-detection section are provided, with reference to the example of FIG. 1.

First, referring to the model of the calculation section, the calculation section of the control device is supplied with $X_1$ and $X_2$ and produces $X_3$ for effecting the operation such as proportional integration calculation. In this case, $X_3$ is calculated by the equation below.

$$X_3 = (K_1 X_1 + K_2 X_2)(1 + 1/TS) \qquad (4)$$

where $K_1$ and $K_2$ are input gains for $X_1$ and $X_2$ respectively, T an integration time constant of the control 5, and S Laplacian. It is assumed that the feedback signal $X_2$ is opposite in polarity to the setting signal $X_1$ and that what is called the deviation signal is obtained by determining the value $K_1 X_1 + K_2 X_2$.

In the model, the calculation of equation (4) for the control is executed by equation (5) below.

$$X_{3(0)}{}^* = K_1(X_{1(0)} + \Delta t/T_1 X_{1(0)} - X_{1(-1)}) - K_2(X_{2(0)} - \Delta t/T_1 X_{2(0)} - X_{2(-1)}) + X_{3(-1)}{}^* \qquad (5)$$

where the index "*" attached to $X_3$ means a model output, and (0) and ($-1$) affixed to $X_1$, $X_2$ and $X_3$ represent the values of the current and previous samplings.

The equation (5) is obtained by converting the equation (4) into a difference equation, as the process is shown below. First, equation (4) is expanded into equation (6). In equation (6), 1/S means an integration, and $X_1$, $X_2$ and $X_3$ are functions of time and therefore are expressed as shown by equation (7).

$$X_3 = K_1 X_1 + K_1 X_1 \cdot 1/T_1 S - K_2 X_2 - K_2 X_2 \cdot 1/T_1 S \qquad (6)$$

$$X_3(t) = K_1 X_{1(t)} + K_1/T_1 \int X_{1(t)} dt - K_2 X_{2(t)} - K_2/T_1 \int X_{2(t)} dt \qquad (7)$$

Incidentally, the expression $X_{1(t)}$, $X_{2(t)}$ and $X_{3(t)}$ indicate that they are functions of time. By differentiating the right and left terms of equation (7), equation (8) is obtained.

$$dX_{3(t)}/dt = K_1 dX_{1(t)}/dt + K_1/T_1 X_{1(t)} - K_2 dX_{2(t)}/dt - K_2/T_1 X_{2(t)} \qquad (8)$$

If this equation (8) is converted into a difference equation, the differentiated term such as $dX_{3(t)}/dt$ is expressed as $X_{3(0)} - X_{3(-1)}/\Delta t$ which is the result of dividing the difference between the value $X_{3(0)}$ of $X_3$ obtained by the current sampling and the value $X_{3(-1)}$ of $X_3$ obtained by the immediately previous sampling divided by the control period (sampling period) $\Delta t$. $X_{1(t)}$ and $X_{2(t)}$ mean $X_{1(0)}$ and $X_{2(0)}$ respectively. Equation (9) is obtained on this basis. The model output, however, is expressed as $X_3^*$ to distinguish it from the detected value $X_3$.

$$X_{3(0)}{}^* - X_{3(-1)}{}^*/\Delta t = K_1 X_{1(0)} - X_{1(-1)}/\Delta t + K_1/T_1 X_{1(0)} - K_2 X_{2(0)} - X_{1(-1)}/\Delta t + K_2/T_1 X_{2(0)} \qquad (9)$$

When this equation is put into order, the model characteristic equation (5) is obtained. Although the equation (5) is concerned with the proportional integration calculation, the model of equation (11) obtained by a similar method of analysis may be employed for the proportional integration calculation expressed by equation (10).

$$X_3 = (K_1 X_1 + K_2 X_2)(1 + 1/ST_1 + K_p S) \qquad (10)$$

$$X_{3(0)} = (1 + \Delta t/T_1 + K_p/\Delta t)(K_1 X_{1(0)} + K_2 X_{2(0)}) - (1 + 2K_p/\Delta t)(K_1 X_{1(-1)} + K_2 X_{2(-1)}) + K_p/\Delta t(K_1 X_{1(-2)} + K_2 X_{2(-2)}) \qquad (11)$$

where $K_p$ is a differentiation coefficient.

Next, a model simulating the characteristics of the operation-detection section will be explained. It is very difficult to express accurately the model of this section, but such an accurate expression is not necessarily required for analysis of a fault. Therefore, according to this invention, it is expressed in the form of a function as shown below.

$$X_2 = G_{(L)}/1 + T_2 S X_3 + B_{(L)} \quad (12)$$

where $G_{(L)}$ is a gain variable with load, and $B_{(L)}$ is a variable varying with load. Also, $1/1+T_2S$ indicates the primary delay. This equation is may be expressed in time area as shown in equation (13) since S means differentiation.

$$X_{2(t)} + T_2\, dX_{2(t)}/dt = G_{(L(t))} X_{3(t)} + B_{(L)} \quad (13)$$

When $dX_{2(t)}/dt$ is converted into a difference equation as mentioned above, the equation below is obtained, where $X_{2(t)}^*$ means a model output.

$$X_{2(t)}^* + T_2\, X_{2(t)}^* - X_{2(t-\Delta t)}^*/\Delta t = G_{(L(t))} \cdot X_{3(t)} + B_{(L(t))} \quad (14)$$

This may be put into order as shown by equation (15) below.

$$X_{2(t)}^* = \Delta t/T_2 + \Delta t\, G_{(L(t))} \cdot X_{3(t)} + T_2/T_2 + \Delta t\, X_{2(t-\Delta t)}^* + B_{(L(t))} \quad (15)$$

In equation (15), characters t attached to $X_2^*$, L and $X_3$ indicate the data at the time of current sampling, and $(t = \Delta t)$ attached to $X_2^*$ the data at the time of the immediately previous sampling. Therefore, they are respectively equivalent to (0) and (−1) mentioned above, so that equation (15) is expressed as equation (16) below.

$$X_{2(0)}^* = \Delta t/T_2 + \Delta t\, G_{(L(0))} \cdot X_{3(0)} + T_2/T_2 + \Delta t\, X_{2(-1)}^* + B_{(L(0))} \quad (16)$$

Figure 4:
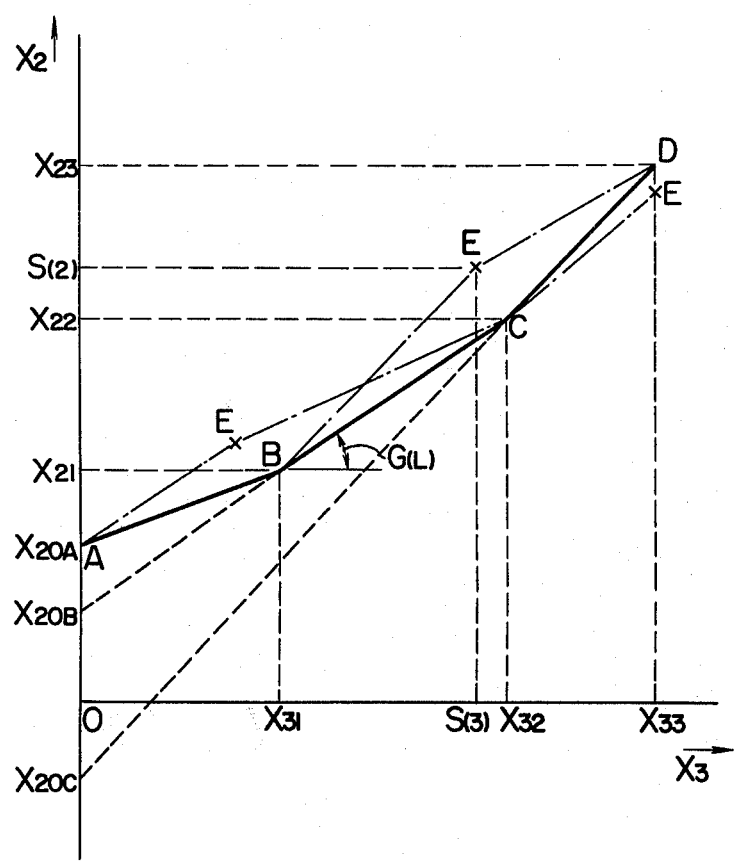
FIG. 4 is a diagram for explaining the correction of a model corresponding to the operation-detecting section of an automatic control device.

In the equation (16), the gain $G_{(L(0))}$ and the variable $B_{(L(0))}$ are actually realized by the functions of $\overline{AB}$, $\overline{BC}$ and $\overline{CD}$ in FIG. 4. FIG. 4 is a diagram showing the relation between $X_3$ and $X_2$, and indicates an example of the plant in which the higher the value $X_3$, the larger the gain $G_{(L)}$. As obvious when compared with equation (13), the variable $B_{(L)}$ represents the values $X_{20A}$, $X_{20B}$ and $X_{20C}$ on the X axis of the straight lines $\overline{AB}$, $\overline{BC}$ and $\overline{CD}$ when $X_3 = 0$. Since this plant is expressed as a function of the primary delay as shown by equation (12), the value $X_2$ slowly changes from $X_{21}$ to $X_{22}$ by the time constant of primary delay $T_2$ in the case where $X_3$ changes in steps from $X_{31}$ to $X_{32}$. By the way, as the load L, the output $X_3$ of the calculation section may be used alternatively. The relation between $X_{3(0)}$ and $G_{(L(0))}$ and $B_{(L(0))}$ in FIG. 4 is stored as the function shown below.

When $X_3 \leq X_{31}$ (in the range of straight line $\overline{AB}$), $$G_{(L(0))} = X_{21} - X_{20A}/X_{31}\; B_{(L(0))} = X_{20A} \quad (17)$$

When $X_{31} < X_3 \leq X_{32}$ (in the range of straight line $\overline{BC}$), $$G_{(L(0))} = X_{22} - X_{21}/X_{32} - X_{31}\; B_{(L(0))} = X_{20B} \quad (18)$$

When $X_{32} < X_3 \leq X_{33}$ (in the range of straight line $\overline{CD}$), $$G_{(L(0))} = X_{23} - X_{22}/X_{33} - X_{22}\; B_{(L(0))} = X_{20C} \quad (19)$$

In CPU, the equations (5), (16), (17), (18) and (19) led from the above-mentioned processes are calculated. First, the step 4 executes the equation (5) to produce the output $X_{3(0)}^*$ of the model of the calculation section. The data $X_{1(0)}$, $X_{1(-1)}$, $X_{2(0)}$ and $X_{2(-1)}$ used in this process are secured already in the memories M in FIG. 2. The data $K_1$, $K_2$, $T_2$ and $\Delta t$ used in this calculation are stored in a separate memory not shown. As to the value $X_{3(-1)}$, the output of the calculation model at the previous calculation is stored. Unless otherwise specified hereinafter, a constant and an output at the time of previous calculation are stored in a separate memory not shown. By the way, in the case where the calculation section performs the proportional integration differentiation, equation (1) is calculated. In this case, data $X_{1(-2)}$ and $X_{2(-2)}$ are used, and it is obvious that the memory M in FIG. 2 is configured so as to store these data also.

Next, the model of the operation-detection section is executed from step B5 to step B10. Step B6 corresponds to equation (17), step B8 to equation (18), step B9 to equation (19) and step B10 to equation (16). The steps B5 and B9 are for selecting the step B6, B8 or B9 depending on the magnitude of the load $X_3$. In this way, the gain $G_{(L)}$ and the variable $B_{(L)}$ of the model of the operation-detection section are calculated. Step B10 executes equation (16) to determine $X_{2(0)}^*$.

The values $X_{3(0)}^*$ and $X_{2(0)}^*$ thus obtained make it possible to determine the deviations $e_{3(0)}$ and $e_{2(0)}$ between the detected values $X_{3(0)}$ and $X_{2(0)}$ respectively by the following equations:

$$e_{3(0)} = |X_{3(0)} - X_{3(0)}^*| \quad (20)$$

$$e_{2(0)} = |X_{2(0)} - X_{2(0)}^*| \quad (21)$$

These calculations are executed in step B11, and steps B12 and B13 determine whether they are larger or not than the set deviations $e_{30}$ and $e_{20}$. If they are larger, the location of a fault is indicated on alarm at steps B14 and B15 respectively. When the location of a fault is indicated on alarm, a jump is made to step B3 resulting in End.

Figure 3A:
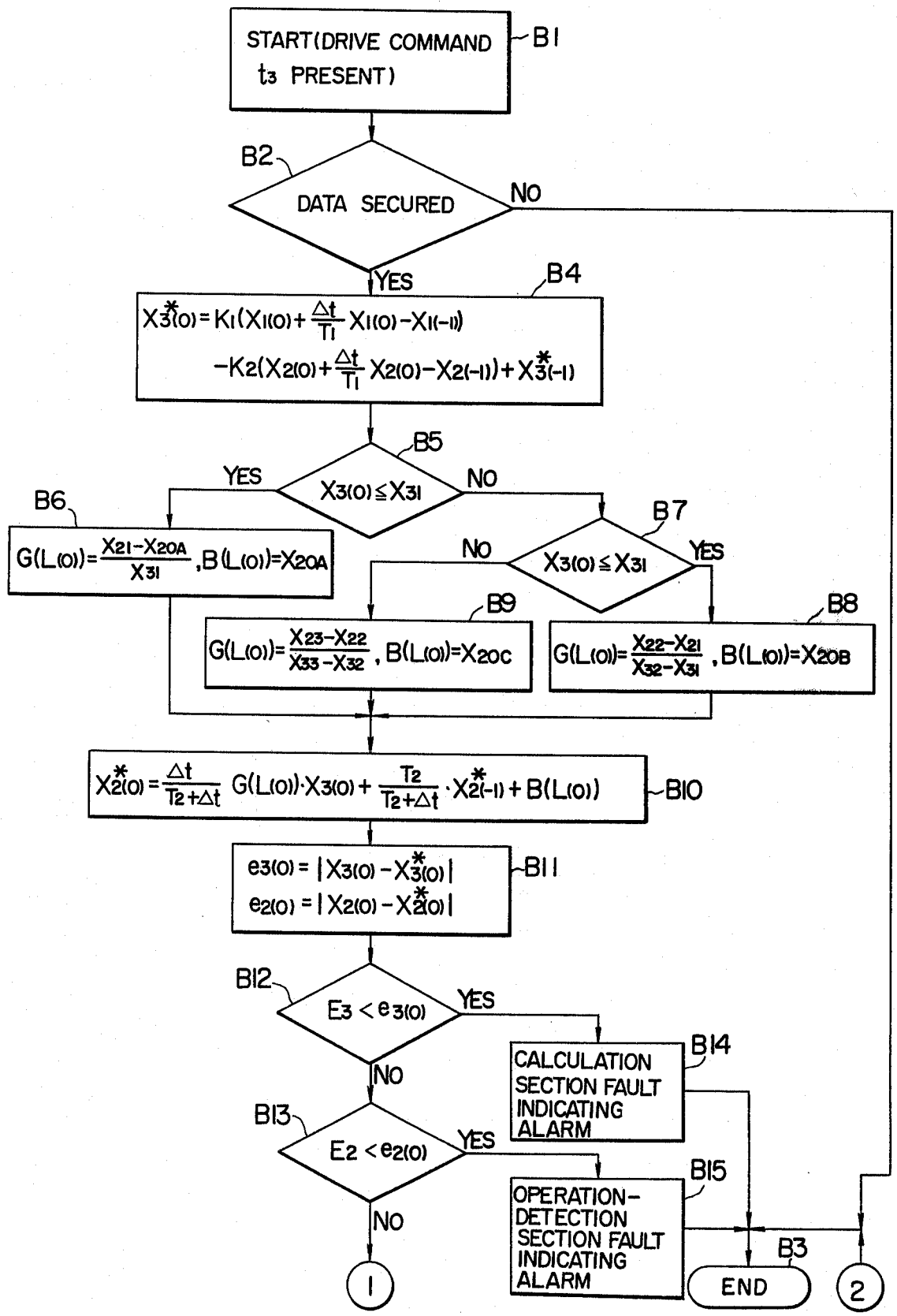
FIGS. 3a to 3c is a flow chart of a program showing steps to be followed when the fault-detecting apparatus according to the invention is made up of a digital computer, or especially one associated with correction of only the static characteristics of the model.
Figure 3B:
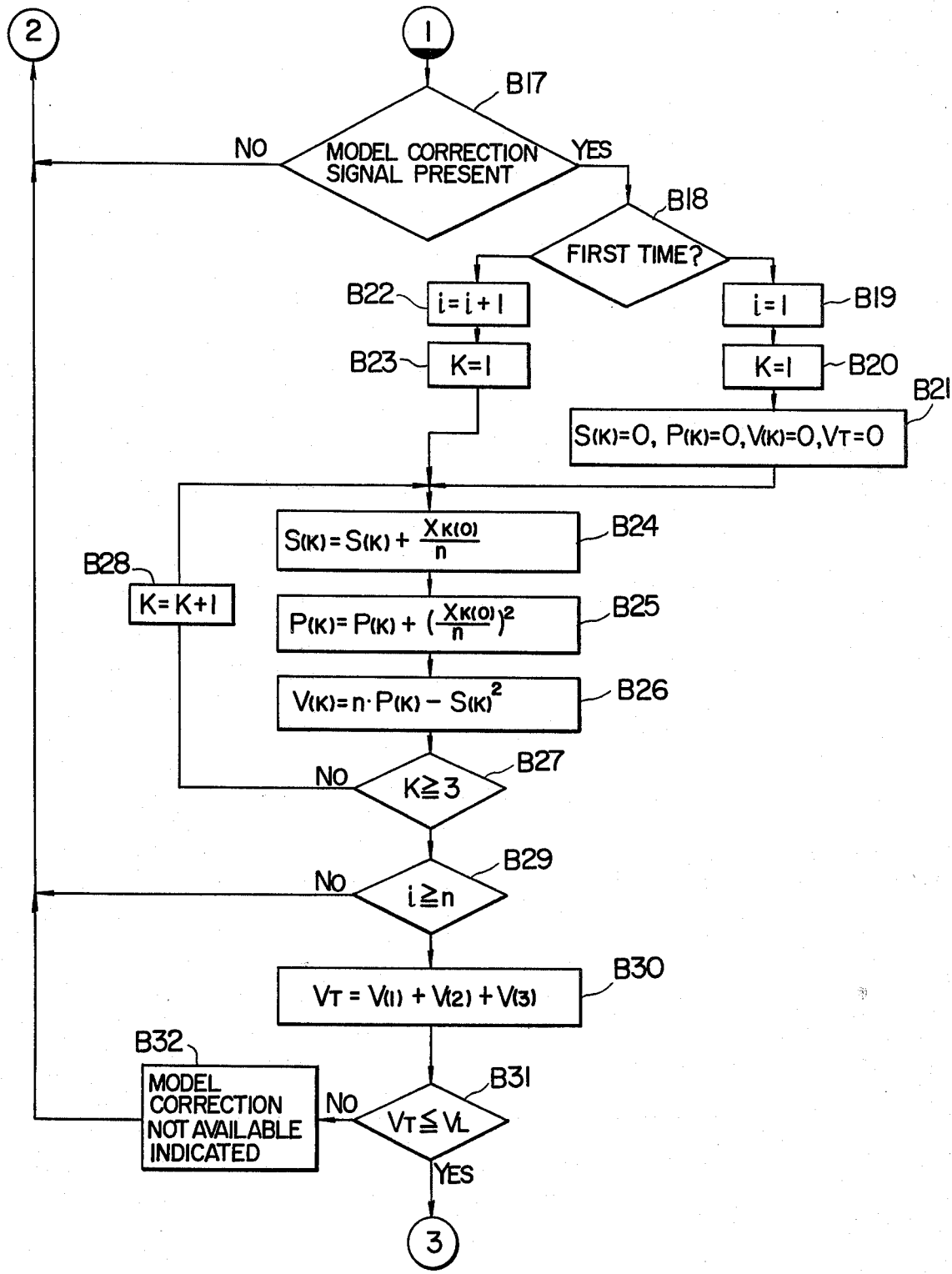

The above-mentioned functon I for detecting the fault by the output of the model and the detected vaue is executed by the steps mentioned above. The function II (calculation of a variation value) will now be explained. This function is executed from steps B16 to 32 in FIG. 3b after step B13. First, in step B17, the presence or absence of a model correction signal is confirmed. This signal is capable of being appropriately applied by the operator. In the absence of this signal, a return in made to step B3, resulting in End. And, confirming the presence of drive signal $t_3$ at step B1, the program of FIG. 3a is executed again. The time required for execution of the whole program of FIG. 3 is shorter than the control period $\Delta t$.

In the presence of the model correction signal, step B18 judges whether the presence of the particular signal is the first experience or not. This judgement is made, for example, by adding +1 to the count when the model correction signal has been received, while the count is cleared to 0 in the case of the first experience.

When the presence of model correction signal is the first experience, $i=1$ and $K=1$ are included in steps B19 and B20, and in step B21, the data in the memories $S_K$, $P_K$ and $V_K$ used for calculation of variations are cleared to zero. If the presence of the model correction signal is experienced two or more times, $i=i+1$ and $K=1$ are included in steps B22 and B23 respectively, and transfer is made to step B24.

In the steps B24, B25 and B26, the average $S_{(K)}$, the square average $P_{(K)}$ and the variation $V_{(K)}$ are calculated. The indexes K attached to S, P and K are 1, 2 or 3 for distinguishing $X_1$, $X_2$ and $X_3$ from each other. When K=1, for instance, $S_{(1)}$, $P_{(1)}$ and $V_{(1)}$ means the average, square average and variation for $X_1$. In this program, after passing step B21 or B23, $S_{(1)}$, $P_{(1)}$ and $V_{(1)}$ for K=1 are obtained in steps B24, B25 and B26. In step B27, whether or not K is three or more is judged, and in step B28, K=K+1, i.e., K=2 is included, thus repeating the execution of steps B24 to B26 up to K=3. As a result, $S_{(1)}$, $P_{(1)}$, $V_{(1)}$, $S_{(2)}$, $P_{(2)}$, $V_{(2)}$, $S_{(3)}$, $P_{(3)}$ and $V_{(3)}$ are calculated. After calculating them all, it is judged in step B29 whether or not $i \geq n$, and if i is smaller than n, return is made to step B3, resulting in End. And the presence of $t_3$ is confirmed in step B1, followed by the same steps as mentioned above. In the meantime, $S_{(K)}$, $P_{(K)}$ and $V_{(K)}$ are updated in accordance with the value of $X_{K(0)}$ at the time of each sampling. Thus, the values of $S_{(K)}$, $P_{(K)}$ and V(K) when $i \geq n$ at step B29 are equal to the values obtained by execution of the equations below respectively.

$$S_{(K)} = \sum_{i=1}^{n} \frac{X_{K(i)}}{n} \quad (22)$$

$$P_{(K)} = \sum_{i=1}^{n} \left(\frac{X_{K(i)}}{n}\right)^2 \quad (23)$$

$$V_{(K)} = n \cdot P_{(K)} - S_{(K)}^2 \quad (24)$$

where n is appropriately determined and if $\Delta t = 1$ and the duration of the model correction signal is 2 minutes, n is 120. Thus the three variations $V_{(1)}$, $V_{(2)}$ and $V_{(3)}$ are determined.

Next, the sum of these three variations are produced, and in step B31, it is judged whether or not $V_T$ is smaller than $V_L$.

Figure 5:
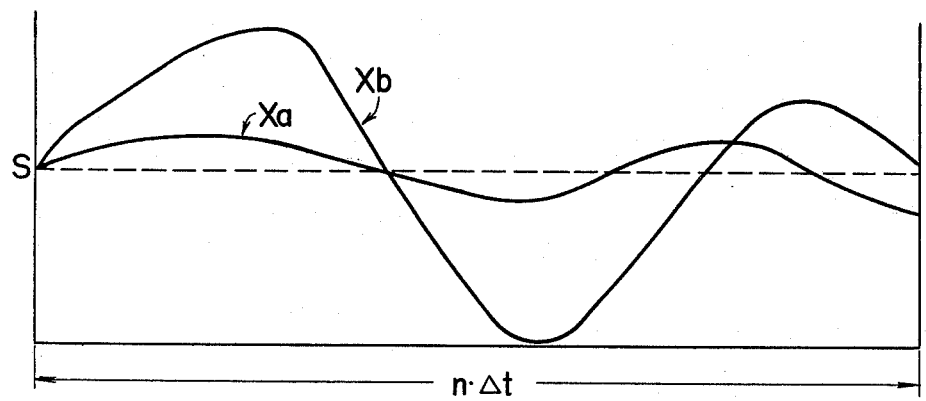
FIG. 5 is a diagram for explaining the physical nature of the degree of deviation from an average value of time-series signals produced for a certain period of time.

The variation V is indicative of the degree of deviation of the input X obtained for the time period $n \cdot \Delta t$ from the average S. As shown in FIG. 5, therefore, if distribution is in the vicinity of the average S as in the case of Xa for the time period of $n \cdot \Delta t$, the variaion is small; while if the distribution is distant from the average as in the case of Xb, the variation is large. It is obvious from this that when the variation during the $n \cdot \Delta t$ is small, the object for control during that time is in steady state, while on the other hand if the variation is large, the object for control is in transient state.

This fact is utilized by the present invention, so that the steady state of control is detected by, say, the small variation, and the static characteristics of the model are corrected on the basis of the data obtained in the steady state. The variation is one of the means for detection of the steady state, and may be replaced for the purpose of this invention by any of the area, deviation and change that may be detected about the average value.

Figure 3C:
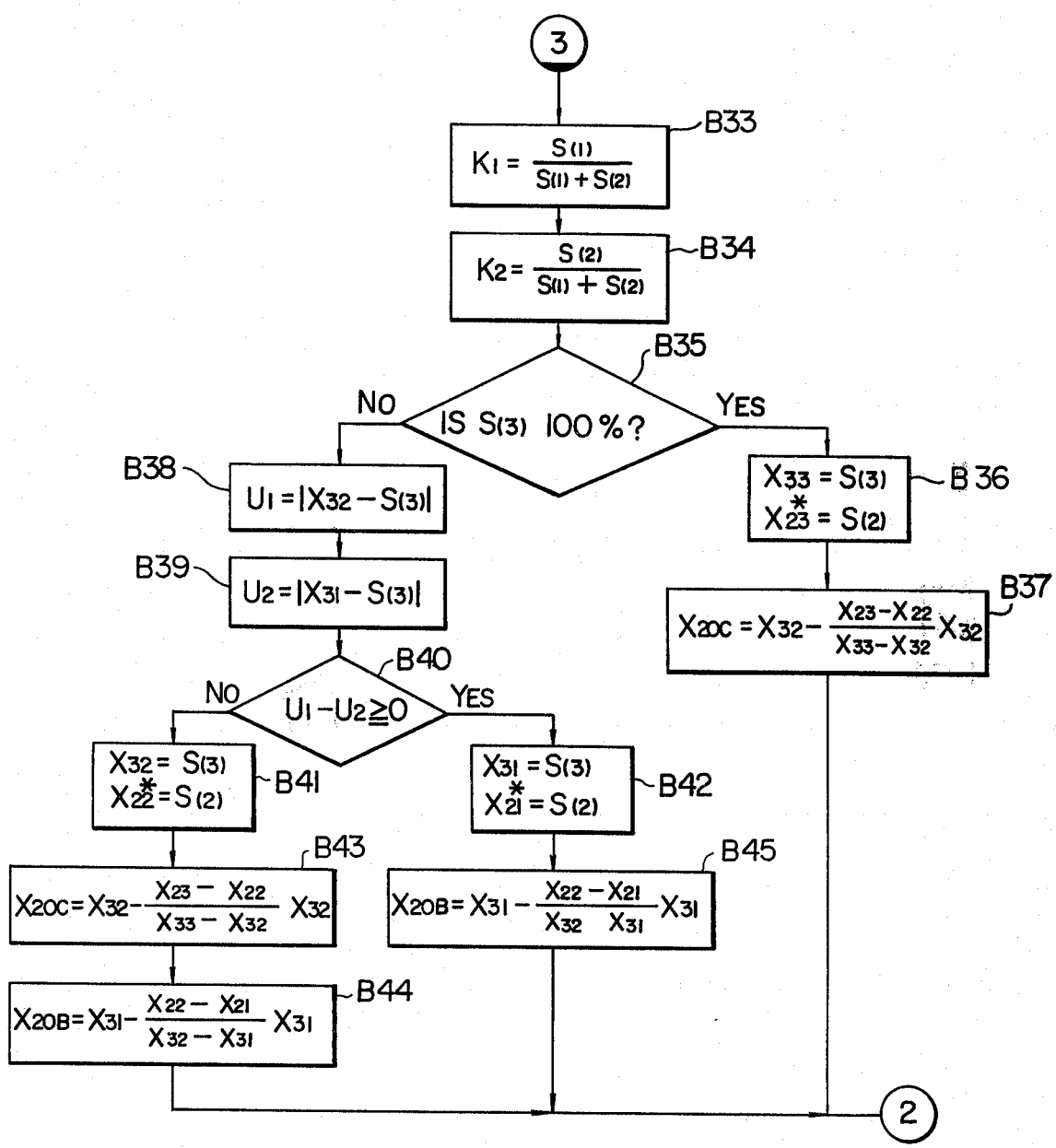

When the steady state is confirmed by the above-mentioned method, transfer is made to FIG. 3c for execution of model correction. If $V_T$ is larger than $V_L$, a transient state is assumed, and therefore the static characteristics of the model is not corrected. In this case, that model correction is not availabe is indicated in step B32, and a return is made to step B3. It is judged at the next change whether or not the model may be corrected, and if it is judged affirmatively, correction is accomplished.

Finally, the model correction function III will be described with reference to FIG. 3c. First, referring to the correction of the model of the calculation section, this model is the result of conversion of equation (4) about the characteristics of controls into a difference equation. The term $K_1X_1 + K_2X_2$ in equation (4) means the deviation between $X_1$ and $X_2$. When this deviation is present, the output $X_3$ of the controls undergoes a great change by producing the product of the same and $1 + 1/ST_1$. Especially due to the presence of the integration term $1/T_1S$, $X_3$ changes greatly by a slight deviation.

In view of the judgement at step B31 that the variation during the period $\Delta t \cdot n$ is small, it is assumed that the change in $X_3$ during that period is small. In other words, it is considered that the equation below using the average value $S_{(1)}$ and $X_1$ and the average value $S_{(2)}$ and $X_2$ during the period $n \cdot \Delta t$ is almost zero.

$$K_1 S_{(1)} + K_2 S_{(2)} = 0 \quad (25)$$

This equation is the result of substituting $S_{(1)}$ and $S_{(2)}$ into $X_1$ and $X_2$ respectively in the equation $K_1X_1 + K_2K_2$. On the other hand, $K_1$ and $K_2$ generally has the relation below.

$$K_1 + K_2 = 1 \quad (26)$$

It is thus understood that when the values $K_1$ and $K_2$ depending on $S_{(1)}$ and $S_{(2)}$ are determined from these equations and the model gain is corrected, the deviation for steady state $(K_1X_1 + K_2X_2)$ theoretically becomes zero. From these equations, $K_1$ and $K_2$ may be expressed by the equations below.

$$K_1 = S_{(1)} / S_{(1)} + S_{(2)} \quad (27)$$

$$K_2 = S_{(2)} / S_{(1)} + S_{(2)} \quad (28)$$

This gain correction is executed in steps B33 and 34.

Next, explanation will be made about the correction of gain $G_{(L)}$ of the model of the operation-detection section. The gain $G_{(L)}$ of this model is stored as a function as described with reference to FIG. 4. For this correction, the values $S_{(3)}$ and $S_{(2)}$ used in steps B24 and B25 are used. Assume that the average value $S_{(3)}$ of $X_3$ during the period $n \cdot \Delta t$ and the varage value $S_{(2)}$ of $X_2$ during the same period are located at positions E in FIG. 4. According to this invention, the characteristics are altered according to the positions E. As an example, explanation will be made about the case in which the characteristics ABCD are corrected to characteristics ABED.

Specifically, the correction of the gain of the model of the operation-detection section is performed in such a manner that correction such as ABCE is effected when the average value $S_{(3)}$ of $X_3$ is 100%, and correction such as ABED and AECD is effected when the value $S_{(3)}$ is near points C and B respectively.

When $S_{(3)}$ is 100%, it is detected by step B35 thereby to change point D to point E. In other words, at step B36, correction is made to attain the condition $X_{33} = S_{(3)}$ and $X_{23}^* = S_{(2)}$. By this data change, the term $G_{(L)} = X_{23}^* - X_{22}^*/X_{33} - X_{32}$ indicating the gradient of the step B9 is changed to represent a straight line $\overline{CE}$.

With the alteration to the straight line $\overline{CE}$, the value $X_{20C}$ associated with $X_3 = 0$ is also corrected. $X_{20C}$ is obtained as $X_{20C} = X_{32} - (X_{23} - X_{22}/X_{32} - X_{32})X_{32}$ in step B37.

In the case where $S_{(3)}$ is not 100%, steps B38 to B40 determine which of points B and C is nearer to the $S_{(3)}$. This function is performed, for example, by determining the absolute values $U_1$ and $U_2$ of the differences between $S_{(3)}$ and $X_{32}$ and between $S_{(3)}$ and $X_{31}$ respectively in steps B38 and B39 respectively, so that the smaller of $U_1$ and $U_2$ is determined in step B40. If $U_1$ is smaller, correction to $\overline{ABED}$ is executed, while if $U_2$ is smaller, correction to $\overline{AECD}$ is effected. In FIG. 3 is shown the case in which points C and B are corrected in steps B41 and B42 respectively. Steps B41 and B42, like step B36, are for correction of the gradient $G_{(L)}$. In steps B43, B44 and B45, $X_{20B}$ and $X_{20C}$ are corrected. Step B43 is associated with straight line $\overline{ED}$, and steps B44 and B45 with straight line $\overline{BE}$. $X_{20A}$ which is a value associated with $X_3 = 0$ need not be corrected. The gain $G_{(L)}$ of the model of the operation-detection section is corrected in the manner mentioned above. After model correction, a return is made to step 3, resulting in End. The program of FIG. 3c is not executed until a model correction command is received again.

Figure 6:
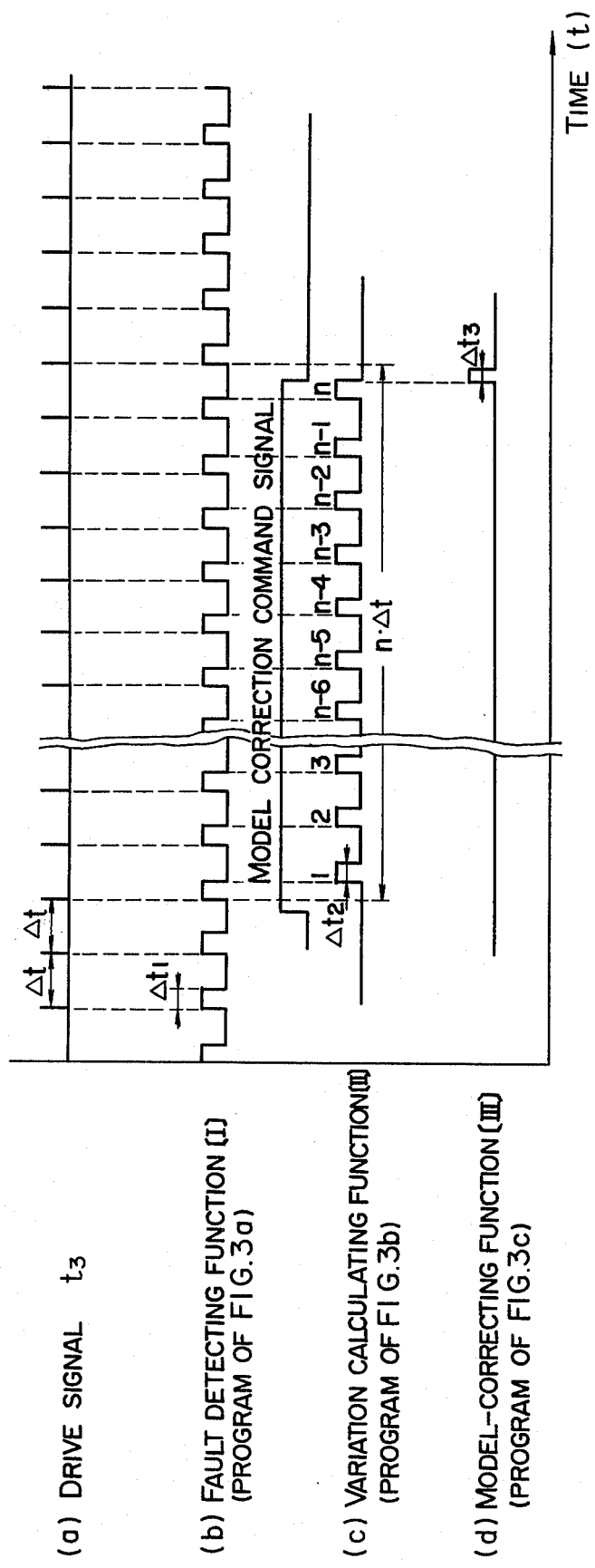
FIG. 6 is a diagram for explaining the order of the steps followed in handling the functions as shown in FIGS. 3a, 3b and 3c with time.

FIG. 6 is a diagram showing the processes through which the functions I, II and III described in detail in FIG. 3 are performed, in which the abscissa represents time and the ordinate the functions. As shown in (a), the drive signal $t_3$ is applied to CPU at the cycle of $\Delta t$. The fault-detecting function I as shown in (b) operates for the time length $\Delta t_1$ each time of receipt of $t_3$, thus executing the program of FIG. 3a. Upon receipt of the model correction command signal, however, the program of FIG. 3b is executed $\Delta t_2$ time after the rise of $\Delta t_1$. This program is executed for the duration $n \cdot \Delta t$. In the cycle of the n-th drive signal $t_3$ after application of the model correction command signal, the final variation value is determined. The model correction function III executes the function of FIG. 3c for model correction by use of the time $\Delta t_3$ after the final variation value is determined. When the variation value is large and model correction is not available, however, model correction is not executed.

In the present invention described above, the variation is a technique for detecting a steady state and thus for correcting the static characteristics of the model in steady state.

Now, with reference to the flow chart of FIG. 7, explanation will be made about another embodiment of the invention, in which, by detection of the steady state and transient state on the basis of the variation, the static and dynamic characteristics of the model are corrected in the steady and transient states respectively. In the embodiment of FIG. 7, many parts of the flow chart of FIG. 3 are usable directly and therefore only those different from them will be primarily explained. Most of such different parts are associated with correction of the dynamic characteristics.

Prior to explanation of the embodiment under consideration, the static and dynamic characteristics will be described. The static characteristics are conceptually a proportional term of the calculation section or operation-detection section, while the dynamic characteristics are conceptually a time term (such as an integration or differentiation term) of the calculation section or operation-detection section.

Figure 8:
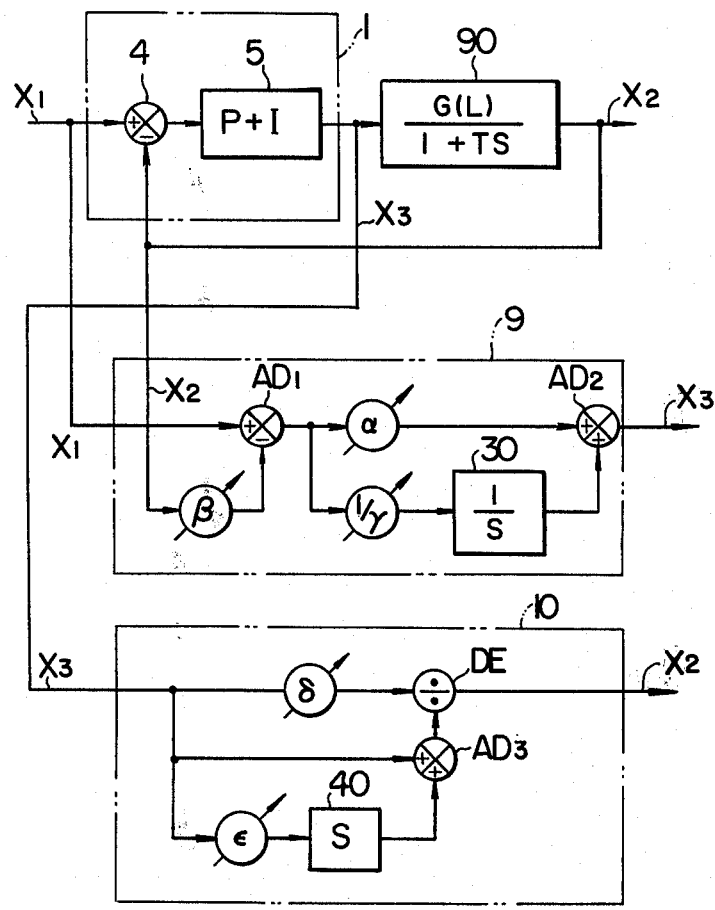
FIG. 8 is a diagram showing a general configuration of the model as it is divided into static and dynamic characteristics.

The model is analogically shown in FIG. 8 for explaining about the static and dynamic characteristics. The upper stage in this drawing represents a system of the automatic control device, and the circuits 9 and 10 in the middle and lower stages show the models of the calculation section 1 and the operation-detection section 90 respectively. The input-output characteristics of the sections 1 and 90 are expressed by equations (4) and (12) above. In the models 9 and 10, characters $\alpha$, $\beta$, $\gamma$, $\delta$, and $\epsilon$ represent the coefficients expressed by the equations below respectively, characters AD an adder, DE a divider, numeral 30 an integrator circuit, numeral 40 a differentiator circuit. The input-output characteristics of this model are the same as those given by equations (4) and (12) above.

$$\begin{aligned}\alpha &= K_1 \\ \beta &= K_2/K_1 \\ 1/\gamma &= K_1/T_1 \\ \delta &= G_{(L)} \\ \epsilon &= T_2 \end{aligned} \qquad (29)$$

Of these coefficients, $\alpha$, $\beta$ and $\delta$ represent static characteristics, and $1/\gamma$ and $\epsilon$ the dynamic characteristics. It is thus clear that the former is a proportional term and the latter a time term (including an integration time constant $T_1$ or the primary delay time constant $T_2$). The example of FIG. 3 shows the correction of the static characteristics $\alpha$, $\beta$ and $\delta$. According to this invention, a steady state of transient state is judged according to the magnitude of variation, and if a steady state is judged, $\alpha$, $\beta$ and $\delta$ are corrected, while in the transient state, $1/\gamma$ and $\epsilon$ are corrected.

The method for such correction will be specifically described below. The explanation about $\alpha$, $\beta$ and $\delta$ of the static characteristics of the model, which are already described with reference to the example of FIG. 3, will be omitted. First, reference is made to the dynamic characteristic $1/\gamma$ of the calculation section 1.

The input-output characteristics of the calculation section 1 are as shown in equation (4). With the output of the adder 4 given as E, this equation is expressed as follows using $\alpha$ and $1/\gamma$;

$$E\alpha + E/S\gamma = X_3 \qquad (30)$$

In this equation, $1/S$ means an integration, and therefore it is rewritten as below.

$$E\alpha + 1/\gamma \int E_{dt} = X_3 \qquad (31)$$

When the calculation by this equation is performed from time point 0 to $n \cdot \Delta t/2$, the output $X_3(n \cdot \Delta t/2)$ of the calculation section 1 is given by $$E_{(\frac{n \cdot \Delta t}{2})} \cdot \alpha + \frac{1}{\gamma} \int_0^{\frac{n \cdot \Delta t}{2}} E_{(t)} dt = X_{3(\frac{n \cdot \Delta t}{2})} \qquad (32)$$

In similar fashion, the output $X_{3(n \cdot \Delta t)}$ of the calculation section when the calculation is made from the time point 0 to $n \cdot \Delta t$ is given by equation (33) below.

$$E_{(n \cdot \Delta t)} \cdot \alpha + \frac{1}{\gamma} \int_0^{n \cdot \Delta t} E_{(t)} dt = X_{3(n \cdot \Delta t)} \qquad (33)$$

where $E_{(n \cdot \Delta t)}$ and $X_{3(n \cdot \Delta t)}$ represent the values of E and $X_3$ respectively at the time point $n \cdot \Delta t$. The difference between the equations (32) and (33) is given by the equation (34) below.

$$\alpha \left\{ E_{(n \cdot \Delta t)} - E_{(\frac{n \cdot \Delta t}{2})} \right\} + \qquad (34)$$

-continued $$\frac{1}{\gamma}\left\{\int_0^{n\cdot\Delta t} E_{(t)}dt - \int_0^{\frac{n\cdot t}{2}} E_{(t)}dt\right\} =$$

$$\left\{X_{3(n\cdot\Delta t)} - X_{3(\frac{n\cdot\Delta t}{2})}\right\}$$

Thus, $\gamma$ is expressed as follows:

$$\gamma = \frac{F}{G - H} \quad (35)$$

where $F = \int_0^{n\cdot\Delta t} E_{(t)}dt - \int_0^{\frac{n\cdot\Delta t}{2}} E_{(t)}dt = \int_{\frac{n\cdot\Delta t}{2}}^{n\cdot\Delta t} E_{(t)}dt$ $G = X_{3(n\cdot\Delta t)} - X_{3(\frac{n\cdot\Delta t}{2})}$ $H = (E_{(n\cdot\Delta t)} - E_{(\frac{n\cdot\Delta t}{2})})\cdot\alpha$ Since $\gamma$ is $T_1/K_1$, correction $T_1 = F/G - H\ K_1$ makes it possible to correct the dynamic characteristics of the model 9 of the calculation section.

The correction of the dynamic characteristics $\epsilon$ of the operation-detection section 10 will be described. The input-output characteristics of the section 10 are shown by equation (12), $T_2$ being $\epsilon$. Equation (12) is rewritten into equation (36), from which $\epsilon$ is determined as shown by equation (37).

$$(1+\epsilon S)X_2 = G_{(L)}X_3 \quad (36)$$

$$\epsilon = G_{(L)}X_3 - X_2/SX_2 \quad (37)$$

where S means a differentiation. The numerator and denominator are multiplied by 1/S (integration) to put them in order, so that equation (37) is rewritten as equation (38).

$$\epsilon = \frac{G_{(L)}X_3 - X_2}{SX_2} = \quad (38)$$

$$\frac{\int_0^{n\cdot\Delta t} G_{(L(t))}X_{3(t)}dt - \int_0^{n\cdot\Delta t} X_{2(t)}dt}{\int_0^{n\cdot\Delta t} (\frac{dX_{2(t)}}{dt})dt} =$$

$$\frac{\int_0^{n\cdot\Delta t} G_{(L(t))}X_{3(t)}dt - \int_0^{n\cdot\Delta t} X_{2(t)}dt}{X_{2(n\cdot\Delta t)} - X_{2(0)}}$$

In this equation, $X_{2(0)}$ is not the value of $X_2$ at the current sampling time point but the value of $X_2$ before $n\cdot\Delta t$ sampling of $X_{2(n\cdot\Delta t)}$. In equation (38), $\epsilon = T_2$, and therefore by adjusting $T_2$ based on equation (38), the dynamic characteristics $\epsilon$ of the operation-detection section are corrected.

Correction of equations (35) and (38) is effected on the basis of the information acquired under a transient state.

The correction of the dynamic characteristics according to the present invention will be explained below with reference to the flow chart of FIG. 7. First, referring to the fault-detecting functions of FIG. 7a, they are quite identical to those in FIG. 3a, and will not be explained below.

In the calculation of the variation value of FIG. 7b, collection of data required for calculation of equations (35) and (38) and the function of determining a transient state are included in addition to the function of FIG. 3b. In the drawing of FIG. 7b, steps B17 to B31 function the same way as in FIG. 3b, those steps of the numbers on the order of one hundred being newly added.

In FIG. 7b, step B100 judges whether or not the adjustment of the dynamic characteristics is available. That is, it is judged whether the object for control is in transient state and the information required for correction of the dynamic characteristics is ready to be collected. This operation is performed either by (1) the operator designating a transient state, or by (2) the fault-detecting apparatus itself detecting a transient state. Although either method is usable, explanation below will be made about the method (2). According to the embodiment under consideration, in order to carry out the method (2), the processes from steps B17 to B30 (similar to those in FIG. 3b) are executed to calculate the variation. If this variation is larger than the upper limit of the variation setting (step B107) and the dynamic characteristics are not adjustable at that time point (step B108), the availability of the adjustment of the dynamic characteristics is decided.

Figure 7A:
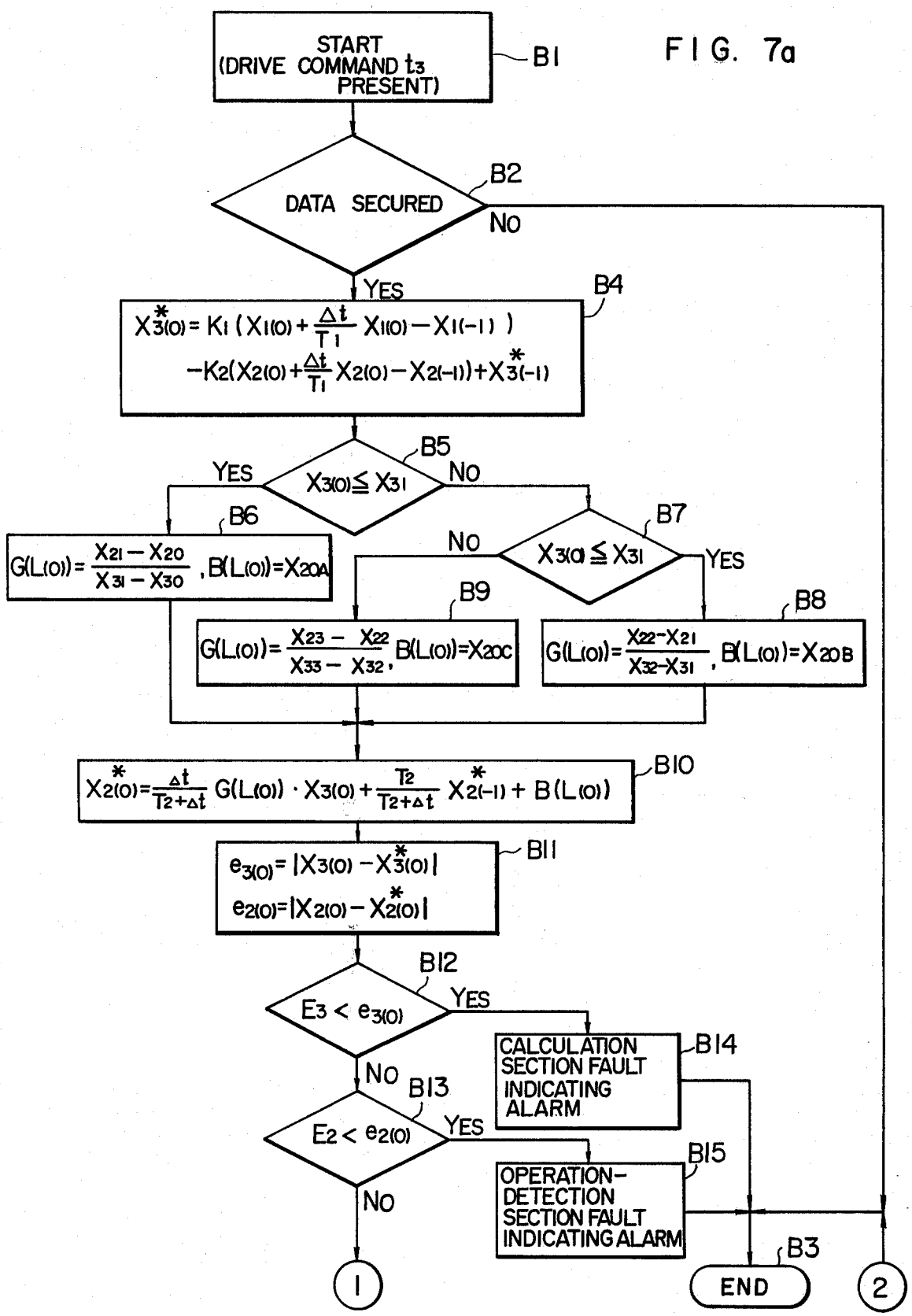

As far as a fault is not detected in the steps of FIG. 7a, the step B100 is executed each time. Since the adjustment of dynamic characteristics is not available in initial stage, however, transfer is made to step B17. If no model correction signal is present, transfer is made from step B17 to step B3, resulting in End. If there is a model correction signal applied, the subsequent steps in FIG. 7b are executed. The order in which the subsequent steps are executed is complicated, although since the adjustment of dynamic characteristics is not yet available, transfer is not on "Yes" sides of steps B100, B102 and B104. Under this condition, the processing route is the same as in FIG. 3b after all, so that the variation $V_T$ is obtained at step B30 after $n\cdot\Delta t$. If $V_T \leq V_L$, it indicates a steady state, and therefore a transfer is made to step B33 in FIG. 3c thereby to correct the static characteristics. If $V_T \geq V_H$ is established in step B107, it indicates a transient state and therefore a transfer is made to step B108, although $V_H > V_L$. In view of the fact that adjustment of the dynamic characteristics is not yet available, however, it is judged in step 109 that the adjustment of the dynamic characteristics is available on the basis of the relation $V_T \geq V_H$, followed by transfer to step B3, resulting in End. From the next processing time point, the processes on "Yes" sides of steps B100, B102, B104 and B108 are performed. In other words, in addition to the calculation of the variation, data collection is carried out for adjustment of dynamic characteristics.

At the next processing time point, step B100 answers "Yes" and transfer is made to step B101. Step B101, which corresponds to step B18, determines whether the process of FIG. 7b is (n+1)th one or not. In order to calculate the variation sum again, indexes i and k are replaced by 1 at steps B19 and B20, while in step B21, the memories $S_{(K)}$, $P_{(K)}$, $V_{(K)}$ and $V_T$ for calculation of the variation are reset to zero. Further, through step B102, the step B103 resets to zero the memory required for calculation for correction of the dynamic characteristics as shown by equations (35) and (38). If the process is not the (n+1)th one at step B101, the index i is made i+1 in step B22, and K is made 1 in step B23. Subsequent to steps B103 and B23, the repetitive calculation from steps B24 to B27 is performed for calculation of the variation.

Next, since step B104 answers "Yes", the information for correction of the dynamic characteristics of step B105 is collected. The step B105 will be described in detail with reference to FIG. 7d. First, in step B110, $I=I+X_{3(0)}\cdot G_{(L(0))}$ is established and then in step B111, $J=J+X_{2(0)}$ is established. The memories I and J are for calculating the terms subsequent to equation (38), and the values stored in the memories I and J after n repeated calculations of steps B100 and B111 are the result of calculation. $G_{(L(x))}$ in step B110 is the same as used in steps B6, B8 and B9.

$$I = \int_0^{n \cdot \Delta t} G_{(L(t))} X_{3(t)} dt$$

$$J = \int_0^{n \cdot \Delta t} X_{2(t)} dt$$

If the time point for $i=n+1$ is determined in step B112, $X_{2(0)}=X_{2(0)}$ is stored in step B113. This figure is used for calculation of the denominator of equation (38).

In step B114, it is determined whether or not $i=n+n/2$, and if "Yes", $X_3(n\cdot\Delta t/2)=X_{3(0)}$, and $E(-n\cdot\Delta t/2)=X_{1(0)}+X_{2(0)}\cdot\beta$ are calculated in steps B115 and B116 respectively. These are used for calculation of the denominator of equation (35). Further, in step B117, the value $F=F+X_{1(0)}+X_{2(0)}\cdot\beta$ is determined. This calculation is also possible in step B119, and during the period $n+n/2 \geq i \geq 2n$, it is stored in the memory F. The final value stored during this period in the memory F is equal to the value below used in equation (35).

$$F = \int_{\frac{n \cdot \Delta t}{2}}^{n \cdot \Delta t} E_{(t)} dt$$

Step B118 is for executing step B119 when $i>n+n/2$. If $i=2n$ is judged in step B120, the calculations below are made in steps B121, B122 and B123 respectively.

$X_{3(n\cdot\Delta t)} = X_{3(0)}$ $X_{2(n\cdot\Delta t)} = X_{2(0)}$ $E_{(n\cdot\Delta t)} = X_{1(0)} + X_{2(0)}\cdot\beta$ Of these values, the value processed in step B121 is used for calculation of the denominator of equation (35), the processed value in step B122 for calculation of the denominator of equation (38) and the processed value of step B123 for calculation of the denominator of equation (35). By the way, if the answer is "No" after the processes in steps B113, B117 and B119 and in step B120, transfer is made to step B3, resulting in End.

Figure 7C:
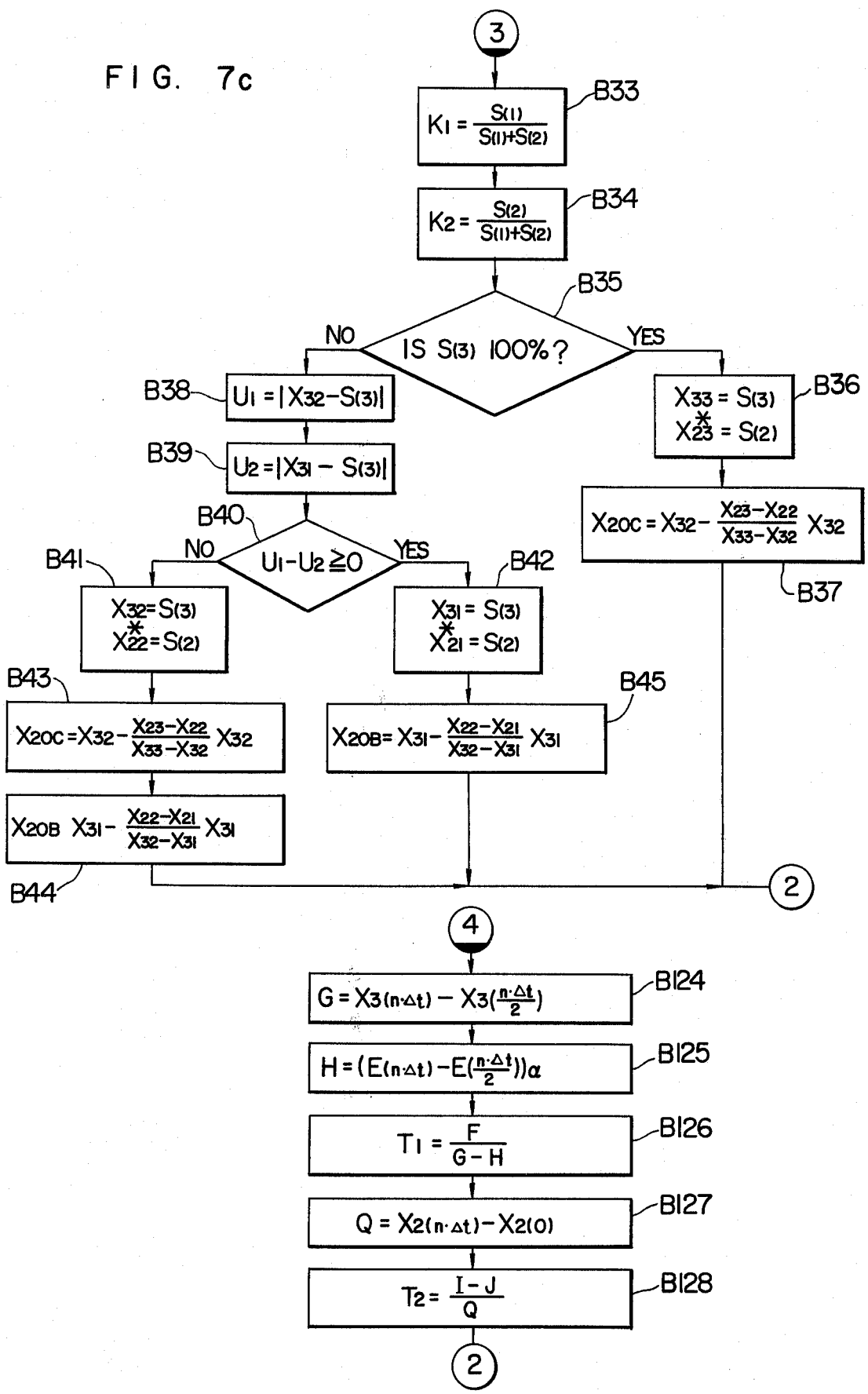
Figure 7D:
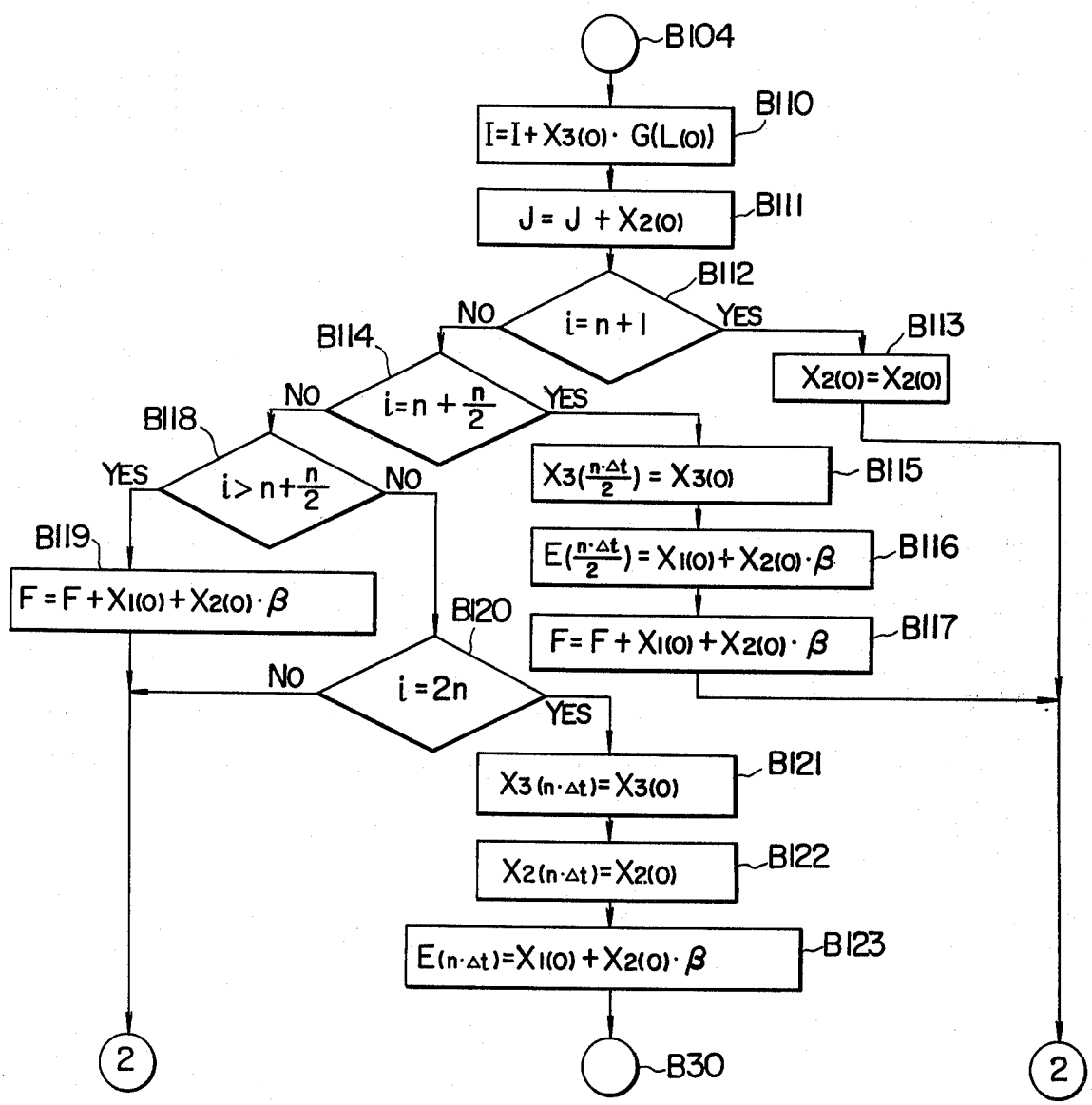

These processes in FIG. 7d are executed n times from the time point $(n+1)\Delta t$ to $2n\cdot\Delta t$, thus collecting the information used for calculation of equations (35) and (38).

In step B30, the variation sum $V_T$ is calculated, and in steps B31 and B107, $V_T$ is compared with $V_L$ and $V_H$ sequentially. As a result, if $V_T \geq V_H$, it indicates a transient state between $(n+1)\Delta t$ and $2n\cdot\Delta t$, and it is judged that by use of the information obtained during this period, the correction of the dynamic characteristics of the model is available. The decision in step B108 is "Yes" as mentioned above, and therefore transfer is made to FIG. 7c thereby to correct the dynamic characteristics.

The diagram of FIG. 7c shows the program for correction of static and dynamic characteristics. The dynamic characteristics will be explained with reference to steps B124 to B128. The dynamic characteristics $\gamma$ of the model of the calculation section will be corrected. First, in step B124, G is determined, and then in step B125, H is determined. In step B126, $T_1 = F/G - H K_1$ is calculated. The calculation of this step B126 is the correction of the dynamic characteristics of the model of the calculation section.

For correction of the dynamic characteristics of the model of the operation detection section, the calculation $Q = X_{2(n\cdot\Delta t)} - X_{2(0)}$ is first conducted in step B127, followed by the final calculation of $\epsilon = T_2 = I - J/Q$ in step B128 by use of the information I, J and Q.

As described in detail above, according to the present invention, the operation for correction of the model is performed directly by the fault-detecting apparatus, and therefore the model correction that has so far been manually periodically or seasonally is completely eliminated. Further, the fault-detecting apparatus judges by itself whether or not the correction of the model is available with respect to both dynamic and static characteristics and the optimum information for model correction is collected, thus always making possible accurate fault detection.

I claim:

1. In a fault-detecting apparatus (8) for a closed-loop control system (1, 2 and 3) having an object for fault detection which makes up part of said control system, said apparatus being supplied with digital signals obtained by sampling input and output of said object with a fixed periodic time, and detecting an abnormal state of said object on the basis of said digital signals so as to notify the occurrence of said abnormal state, said apparatus (8) comprising:

mathematical model means (B4-B10) simulating an input-output characteristic of said object included in said control system (1, 2 and 3), said model means being supplied with the digital signals corresponding to the input of said object with every sampling, and generating the digital signals corresponding to the output of said object;

first means (B11-B15) for comparing the output of said model means with the output of said object with every sampling, and for detecting an abnormal state of said object so as to notify the occurrence of the abnormal state;

second means (B17-B30) for receiving time-series digital signals relating to one of input and output of said object for a predetermined period when the presence of a model correction signal is confirmed, for determining an average value of said time-series digital signals received during the predetermined period, and for generating a signal corresponding to the degree of the deviation of said time-series digital signals from said average value;

third means (B31) for determining whether or not the correction of the characteristic of said model means is possible, on the basis of said signal corresponding to the degree of the deviation;

fourth means (B33-B45) for correcting the characteristic of said model means on the basis of said time-series digital signal received during the same period as said predetermined period of said second means when said third means decides that the correction is possible, 2. In a fault-detecting apparatus (8) for a closed-loop control system (1, 2 and 3) having an object for fault detection which makes up part of said control system, said apparatus being supplied with digital signals obtained by sampling input and output of said object with a fixed periodic time, and detecting an abnormal state of said object on the basis of said digital signals so as to notify the occurrence of said abnormal state, said apparatus (8) comprising:

mathematical model means (B4-B10) simulating an input-output static characteristic of said object included in said control system (1, 2 and 3), said model means being supplied with the digital signals corresponding to the input of said object with every sampling, and generating the digital signals corresponding to the output of said object;

first means (B11-B15) for comparing the output of said model means with the output of said object with every sampling, and for detecting an abnormal state of said object so as to notify the occurrence of the abnormal state;

second means (B17-B30) for receiving time-series digital signals relating to one of input and output of said object for a predetermined period when the presence of a model correction signal is confirmed, for determining an average value of said time-series digital signals received during the predetermined period, and for generating a signal corresponding to the degree of the deviation of said time-series digital signals from said average value;

third means (B31) for deciding that the correction of the input-output static characteristic of said model means is possible when said signal corresponding to the degree of the deviation is less than a predetermined value;

fourth means (B33-B45) for correcting the input-output static characteristic of said model means on the basis of said timeseries digital signal received during the same period as said predetermined period of said second means when said third means decides that the correction is possible.

3. In a fault-detecting apparatus (8) for a closed-loop control system (1, 2 and 3) having an object for fault detection which makes up part of said control system, said apparatus being supplied with digital signals obtained by sampling input and output of said object with a fixed periodic time, and detecting an abnormal state of said object on the basis of said digital signals so as to notify the occurrence of said abnormal state, said apparatus (8) comprising:

mathematical model means (B4-B10) simulating an input-output dynamic characteristic of said object included in said control system (1, 2 and 3), said model means being supplied with the digital signals corresponding to the input of said object with every sampling, and generating the digital signals corresponding to the output of said object;

first means (B11-B15) for comparing the output of said model means with the output of said object with every sampling, and for detecting an abnormal state of said object so as to notify the occurrence of the abnormal state;

second means (B17-B30) for receiving time-series digital signals relating to one of input and output of said object for a predetermined period when the presence of a model correction signal is confirmed, for determining an average value of said time-series digital signals received during the predetermined period, and for generating a signal corresponding to the degree of the deviation of said time-series digital signals from said average value;

third means (B31) for deciding that the correction of the input-output dynamic characteristic of said model means is possible when said signal corresponding to the degree of the deviation is larger than a predetermined value, fourth means (B33-B45) for correcting the input-output dynamic characteristics of said model means on the basis of said time-series digital signal received during the same period as said predetermined period of said second means when said third means decides that the correction is possible.

4. In a fault-detecting apparatus (8) for a closed-loop control system (1, 2 and 3) having an object for fault detection which makes up part of said control system, said apparatus being supplied with digital signals obtained by sampling input and output of said object with a fixed periodic time, and detecting an abnormal state of said object on the basis of said digital signals so as to notify the occurrence of said abnormal state, and apparatus (8) comprising:

mathematical model means (B4-B10) simulating input-output static and input-output dynamic characteristics of said object included in said control system (1, 2 and 3), said model means being supplied with the digital signals corresponding to the input of said object with every sampling, and generating the digital signals corresponding to the output of said object;

first means (B11-B15) for comparing the output of said model means with the output of said object with every sampling, and for detecting an abnormal state of said object so as to notify the occurrence of the abnormal state;

second means (B17-B30) for receiving time-series digital signals relating to one of input and output of said object for a predetermined period when the presence of a model correction signal is confirmed, for determining an average value of said time-series digital signals received during the predetermined period, and for generating a signal corresponding to the degree of the deviation of said time-series digital signals from said average value;

third means (B31) for deciding that the correction of the input-output static characteristic of said model means is possible when said signal corresponding to the dgree of the deviation is small relatively, and that the correction of the input-output dynamic characteristics of said model means is possible when said signal is large relatively;

fourth means (B33-B45) for correcting the characteristic of said model means on the basis of said time-series digital signal received during the same period as said predetermined period of said second means when said third means decides that the correction is possible.

5. A fault-detecting apparatus according to claim 1, 2, 3 or 4, in which the variation of said time-series digital signal is used as a signal corresponding to the degree of deviation of said time-series digital signal from said average value.

6. In fault-detecting apparatus (8) for a closed-loop control system (1, 2 and 3) in which an object for fault detection is controls which makes up part of said control system, said controls producing an output ($X_3$) ($X_3 = f(K_1X_1 + K_2X_2)$) on the basis of the deviation ($K_1X_1 + K_2X_2$) between a target signal ($X_1$) and feedback signal ($X_2$), said apparatus being supplied with digital signals obtained by sampling inputs $X_1$ and $X_2$ and output ($X_3$) of said controls with a fixed periodic time, and detecting an abnormal state of said controls on the basis of said digital signals so as to notify the occurrence of said abnormal state, said apparatus (8) comprising:

- mathematical model means (B4-B10) simulating an input-output characteristic $X_3 = f(K_1X_1 + K_2X_2)$) of said controls included in said control system (1, 2 and 3), said model means being supplied with the digital signals corresponding to the input ($X_1$ and $X_2$) of said controls with every sampling, and generating the digital signals ($X_3^*$) corresponding to the output ($X_3$) of said controls;
- first means (B11-B15) for comparing the output ($X_3^*$) of said model means with the output ($X_3$) of said controls with every sampling, and for detecting an abnormal state of said controls so as to notify the occurrence of the abnormal state;
- second means (B17-B30) for receiving time-series digital signals relating to at least the input ($X_1$ and $X_2$) of said controls for a predetermined period when the presence of a model correction signal is confirmed, for determining an average value ($S_1$ and $S_2$) of said time series digital signals ($X_1$ and $X_2$) received during the predetermined period, and for generating a signal corresponding to the degree of the deviation of said time-series digital signals from said average value;
- third means (B31) for determining whether or not the correction of the characteristic of said model means is possible, on the basis of said signal corresponding to the degree of the deviation;
- fourth means (B33-B45) for correcting to $K_1 = S_1/S_1 + S_2$ and $K_2 = S_2/S_1 + S_2$ on the basis of average values ($S_1$ and $S_2$) of said time series digital signal received during the same period as said predetermined period of said second means when said third means decides that the correction is possible.

7. In a fault-detecting apparatus (8) for a closed-loop control system (1, 2 and 3) in which an object for fault detection is an operation section which makes up part of said control system, said operation section being controlled by an operation signal ($X_3$) and producing a feedback signal ($X_2$), said apparatus being supplied with digital signals obtained by sampling input ($X_3$) and output ($X_2$) of said operation section with a fixed periodic time, and detecting an abnormal state of said operation section on the basis of said digital signals so as to notify the occurrence of said abnormal state, said apparatus (8) comprising:

- mathematical model means (B4-B10) simulating an input-output characteristic of said operation section included in said control system (1, 2 and 3), by a polygonal function with the gradient variable according to the value of $X_3$, said model means being supplied with the digital signals corresponding to the input ($X_3$) of said operation section with every sampling, and generating the digital signals ($X_2^*$) corresponding to the output ($X_2$) of said operation section;
- first means (B11-B15) for comparing the output ($X_2^*$) of said model means with the output ($X_2$) of said operation section with every sampling, and for detecting an abnormal state of said operation section so as to notify the occurrence of the abnormal state;
- second means (B17-B30) for receiving time-series digital signals relating to one of input ($X_3$) and output ($X_2$) of said operation section for a predetermined period when the presence of a model correction signal is confirmed, for determining an average values ($S_2$ and $S_3$) of said time-series digital signals ($X_2$ and $X_3$) received during the predetermined period, and for generating a signal corresponding to the degree of the deviation of said time-series digital signals from said average value;
- third means (B31) for determining whether or not the correction of the characteristic of said model means is possible, on the basis of said signal corresponding to the degree of the deviation;
- fourth means (B33-B45) for correcting the polygonal function of the characteristic of said model means on the basis of the average values ($S_2$ and $S_3$) of said time-series digital signal received during the same period as said predetermined period of said second means when said third means decides that the correction is possible.

* * * * *